(12) United States Patent
Porubcan et al.

(10) Patent No.: US 9,070,130 B1
(45) Date of Patent: *Jun. 30, 2015

(54) ON-LINE AUTHENTICATION OF PROBIOTICS TO ENSURE SOURCE AND QUALITY

(71) Applicants: Randolph S. Porubcan, Victoria, MN (US); Jeff Thurston, Waverly, PA (US)

(72) Inventors: Randolph S. Porubcan, Victoria, MN (US); Jeff Thurston, Waverly, PA (US)

(73) Assignee: MASTER SUPPLEMENTS, INC., Victoria, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,339

(22) Filed: Aug. 19, 2014

Related U.S. Application Data

(63) Continuation-in-part of application No. 14/197,254, filed on Mar. 5, 2014, now Pat. No. 8,833,643.

(51) Int. Cl.
*G06F 17/00* (2006.01)
*G06Q 30/00* (2012.01)

(52) U.S. Cl.
CPC .................................. *G06Q 30/018* (2013.01)

(58) Field of Classification Search
USPC ............................ 235/375, 383, 385; 700/232
IPC .................... G06Q 30/02,30/06, 20/20, 10/087, G06Q 10/08; G07F 7/1008
See application file for complete search history.

(56) References Cited

U.S. PATENT DOCUMENTS 8,833,643 B1 * 9/2014 Porubcan et al. .............. 235/375

* cited by examiner

*Primary Examiner* — Karl D Frech
(74) *Attorney, Agent, or Firm* — Eric P. Mirabel

(57) ABSTRACT

Disclosed is encoding of probiotic formulations, in order to alert both consumer and producer to counterfeiting and to allow purchasers of authentic product to gain access to quality and quantity testing regarding the product. The purchaser would preferably also provide, along with its identifying information, any product complaints, adverse reaction and positive responses, and consumer interest in and reaction to different formulations and products, as well as demographic, general health and education information, and other information about the purchaser (including any information useful for marketing and future product development and selection).

21 Claims, 2 Drawing Sheets

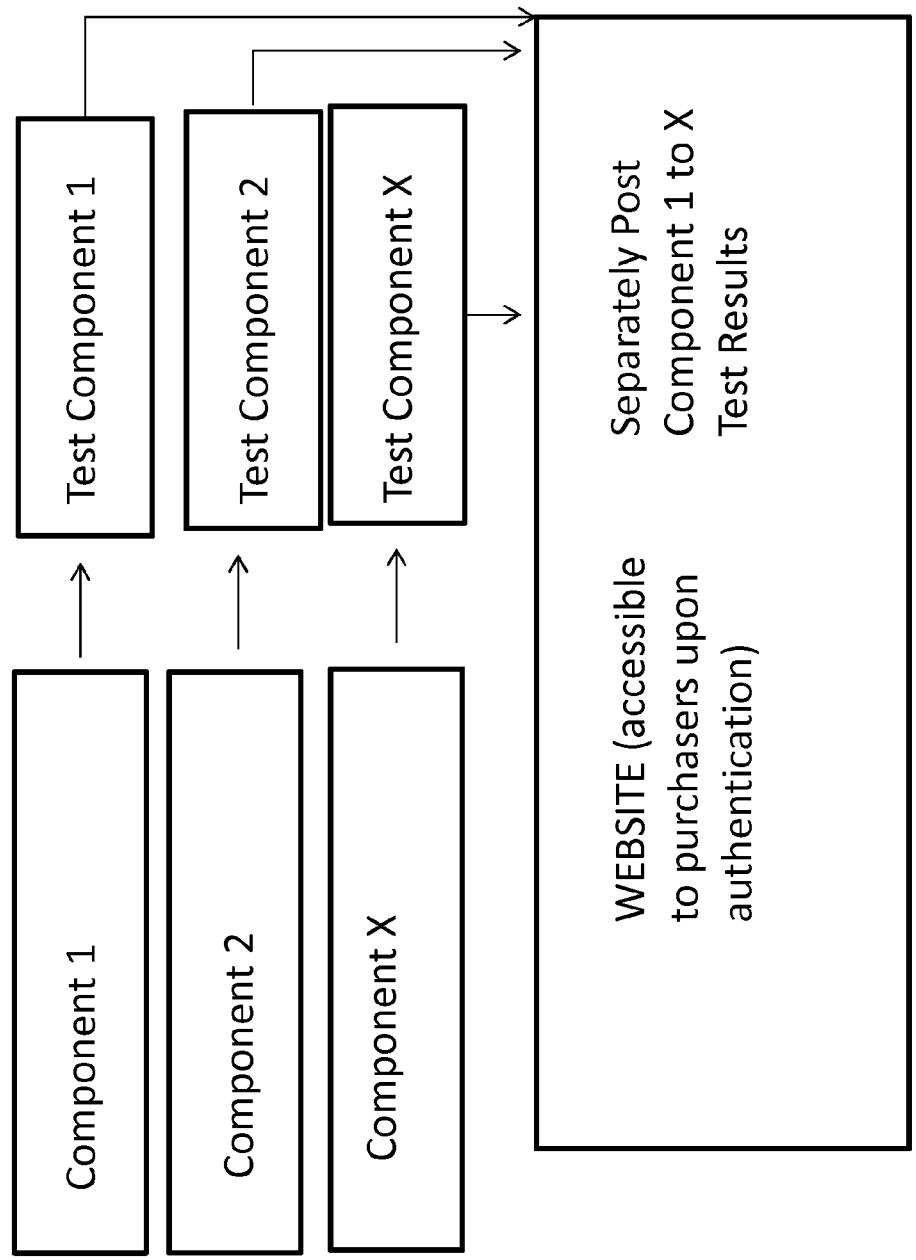

ON-LINE AUTHENTICATION OF PROBIOTICS TO ENSURE SOURCE AND QUALITY

BACKGROUND

Probiotics and prebiotics are a growing sector of the supplements market, estimated to be approaching $2 Billion in sales annually (if one includes probiotic fortified foods and desserts, as well as dedicated supplement forms such as capsules and tablets). The term "probiotic" typically refers to strains of lactic acid bacteria and bifidobacteria. The specific strains present in probiotic products may vary widely among different products, as may their quantity, activity and purity. Different products can also lose activity at different rates over time, particularly in the event of temperature fluctuations (particularly increases in temperature).

Probiotics are marketed as natural supplements, and therefore do not require approval for efficacy against diseases or conditions, by the US Food & Drug Administration ("FDA") or any other governmental agency. The FDA does regulate manufacture, labeling, packaging and holding of these products as set forth in 21 CFR 111, under its authority within the applicable federal laws. These regulations, 21 CFR 111, require extensive record-keeping—but do not require disclosure of these records to the consumer: only to the FDA. The consumer is mostly unable to verify date of production, or any quantity or quality testing (i.e., activity and purity) on the products offered for purchase. Consumers and retailers are limited to reviewing label claims about the strains present and their quantity, or quality. Due to the growth in the market, the leading products are attractive targets for product counterfeiters, which raises additional quality-control concerns for the consumer.

Accordingly, a system in allowing verification of the source of the product, its quality testing (for quantity, activity and purity) and its date of production and/or testing, would offer a significant benefit.

SUMMARY

Following quantity or quality testing, the container or packaging for a probiotic or prebiotic product is encoded, preferably with an RFID tag or with a code (e.g., on a product label) which can be scanned by the purchaser (whether consumer or vendor). The encoding allows the purchaser to access a website where detailed information about the product—including testing results for its number of colony forming units ("CFU"), activity, purity, and possibly other information including its testing date, production date and lot number (among other lots of product)—is available.

The encoding is also an anti-counterfeiting measure, as the encoded product would be associated with its code by the producer at the origin in such a way that the scanning of the code by the purchaser would match the code logged, if the product is authentic; but otherwise would not. The encoding could be used to alert both consumer and producer to counterfeiting. That is, if a counterfeit label is detected by mismatch, the product producer could be automatically notified.

The purchaser (whether consumer or vendor) provides its identifying and contact information to the seller or the producer or formulator or a party contacted or responsible for the website (all or any of which are referred to hereinafter as "producer"), either when setting up an account on the website or as part of authenticating the encoding. When the purchaser enters or scans the code on the product to authenticate the product, that would automatically alert both purchaser and the producer if the label is not recognized (meaning the product is counterfeit). This information could thereby automatically allow tracking of counterfeit products and their distribution pattern, if, in a more preferred embodiment, the purchaser also entered its location, and the source it purchased from, along with its identifying information. In an even more preferred embodiment, the purchaser would also provide, along with identifying information, any product complaints, adverse reaction and positive responses, and interest in and reaction to different formulations and products, as well as demographic, general health and education information, and other information about the purchaser/consumer (including any information useful for marketing and future product development and selection).

One method of obtaining purchaser information is to have a website with the product information, where in order to access the product information, the purchaser has provided requested information about itself. It is preferred that this website be separated from other websites of the producer, in particular, from any website where product is offered for sale. The separation is so that end-user consumers cannot buy any product on the separate website, so that purchasers who are distributors or retailers do not have their sales (including through their own websites or otherwise) of their products threatened in any way by the website where the product information is displayed. After initially providing the identifying information about itself, the purchaser can be given a user ID and password for all future product inquiries. That information can then be used to identify the purchaser, and their location, and potentially obtain feedback and product reports from the purchaser, as set forth below.

BRIEF DESCRIPTION OF THE DRAWINGS

FIG. 2 depicts that product information can include quality-related information from all manufacturers of each component in a final formulation, all of whom make such information accessible to purchasers.

DETAILED DESCRIPTION

Website Configurations

Figure 1:
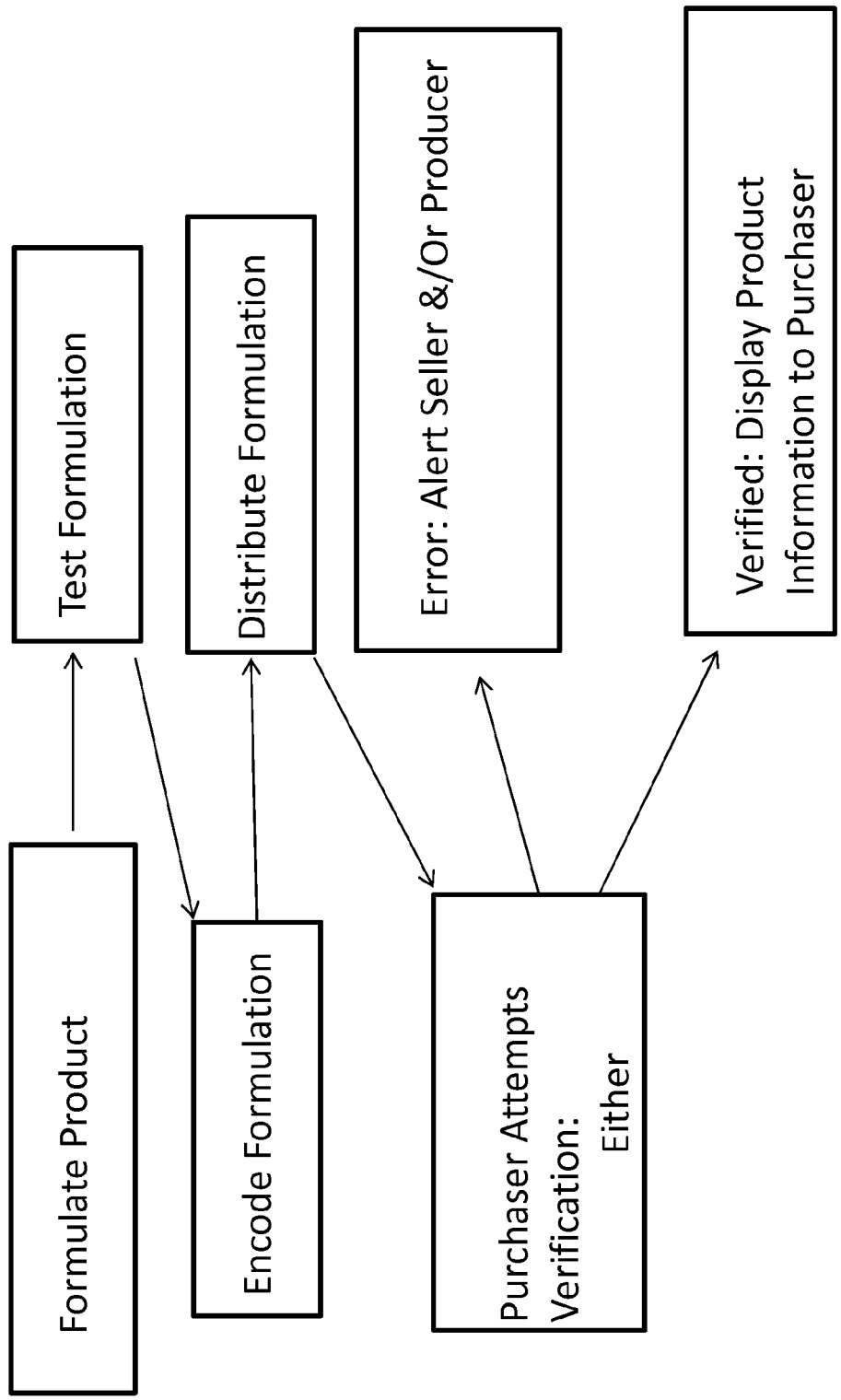
FIG. 1 depicts that when verification of an encoded product fails, the producer and/or seller is notified; and if the verification indicates the product is genuine, the purchaser accesses relevant product information.

The website where the product information is accessed, and from which information is supplied to the purchaser, is the key component in the system described herein. The relationship between the website and the purchasers can take a number of forms. In one example, the website is controlled by a server which is coupled to one or more purchaser terminals (which may be a personal computer ("PC") or device) through the Internet. Communication software including browser software is installed at each purchaser terminal for communicating information with server via the HyperText Transfer Protocol ("HTTP"). The server is identified by a predetermined Uniform Resource Locator ("URL") on Internet.

After the establishment of communication connection with the server, the purchaser terminal is assigned an IP address for identification on the Internet. A user at the purchaser terminal may then communicate with the server by accessing the aforementioned identifying URL through the Internet.

The website content can be either static or dynamic. A dynamic-content site is preferred as it can monitor a changing situation, or provide information personalized to the requirements of the individual user. For example, the user might have medical conditions or be taking other medications which can activate the website to issue warnings or advisory messages. The website can also warn of contaminated product on the market, or note the most recent quality testing performed on products. The website should also preferably include a searchable feature and be able to respond to user inquiries or concerns, including by allowing messaging to purchaser by a website user.

Encoding and Analysis

Products, or their labels or packaging or shipment containers, can be encoded by any of several methods, including RFID tags (see, e.g., U.S. Pat. Nos. 7,068,170; 7,336,167; and No. 8,120,466, disclosing encoded data signals from an RFID tag; all are incorporated by reference). RFID tags also allow tracking of product location (U.S. Pat. No. 7,336,167). RFID transponders (a/k/a "tags") have at least two components, an integrated circuit (IC) chip and an antenna. The chip and antenna can be laminated on plastic cards, encapsulated in protective housings, embedded in label stock, or otherwise displayed in a portable form.

RFID tags can be classified as either active or passive, based on the tag's power source and how the tag sends information to readers. Active tags have an internal transmitter powered by an onboard battery while passive tags are powered by an external reader's signal. In a passive tag, the reader's transmission energizes the tag's antenna, which in turn resonates back a corresponding signal.

An RFID reader or interrogator retrieves information stored on a tag through a radio frequency signal picked up by the reader's antenna. An active reader receives signals broadcast by the tag's internal RF transmitter. Some active tags broadcast their signals continuously without regard to whether there is a reader within receiving range. Other active tags require a prompt signal from a reader before broadcasting their data stream.

A passive reader transmits a signal strong enough to energize the target tag's antenna and circuitry. The tag resonates the signal back to the reader.

Generally, the tag itself cannot incorporate a GPS locator device, due to size constraints. The location of the tag can be ascertained using a GPS system integrated with the tag reader, as described in U.S. Pat. No. 8,253,570, incorporated by reference. In this system, the RFID reader has RFID radar thereon in order to determine the distance between the reader and the tag. The reader uses a directional antenna such as a Yagi-Uda antenna or a parabolic dish antenna in order to dramatically increase the effective range between the reader and the RFID tag. A digital compass is located on the reader so that once the reader locates the RFID tag, the direction to the tag from the reader can be determined. A GPS chip is also located on the reader so that once the reader determines the distance and direction to the RFID tag, an algorithm can be employed to determine the exact GPS coordinates for the RFID tag based upon the knowledge of the GPS coordinates for the reader. This system could be used to locate products where RFID tags with GPS locator are embedded in the product packaging, or in shipment containers for the products.

RFID tags offer the advantage of secure coding, as well as potentially providing product location, but suffer the disadvantage of being higher cost than a simple encoding system, like a bar code. RFID tags must be read by a reader, and it would be impractical to provide a reader to consumers (though readers could be carried by distributors, retailers or re-sellers of bulk lots of product). One alternative to maintain the advantages provided by RFID tags with or without a GPS locator incorporated, is to include them with a shipment of multiple formulations (like, inside a shipping container), and to also have individual packages of the formulation further encoded with another encoding method, e.g., a scannable code as described below.

Encoding with a bar code or other scannable encoding methods, includes encoding using a QR Code™ (U.S. Pat. No. 5,726,435, incorporated by reference) or other two-dimensional bar code. Scannable encoding is preferred as it can be readily scanned (with e.g., a cell phone), following which the scanned code can be authenticated through imaging, without further action by any human actor or by the purchaser (i.e., the purchaser does not need to do any data input, which can lead to mistakes in entry).

Where the purchaser is not the ultimate consumer, such purchaser may be under a contractual obligation to scan lots of product which it receives, for authentication and quality verification. The obligation of such purchaser could be to scan all products or their labels, or only to scan some sample product or their labels. The obligation of such purchaser could also be to help others (including end-user consumers) verify authentication and quality on the website. The obligation of such purchaser could also be to maintain a web-site portal at their place of business where product is sold, or allow access to the producer's website through a purchaser website.

The website that the encoding (associated with the product) is transmitted to for authentication would display relevant information about the encoded product, including, preferably, the lot number it originated from and its date of formulation, as well as activity, purity and bacterial quantity (generally determined by CFUs in a plate count). In the event a non-genuine label is detected, the purchaser and producer would both be immediately alerted. The consumer would preferably see information on-screen at the website and also receive a message from the website, asking for help further identify the source of the counterfeit product, including preferably the location of the source and contact information for the source.

In another example, in the event of sub-standard products or product contamination, whether accidental or deliberate (like the Tylenol poisonings of 1982) the localization of such product is facilitated by the producer having the consumer contact and address, and the source of the product, and the source location. This information can be used by the producer to identify problems with any particular lots of product, including whether the contamination was introduced after production or shipment. This information could be used to aid in quickly removing contaminated or sub-standard products from the marketplace.

Product purchasers with access to the product information would generally be either product sellers (distributors or retailers) or end-users (consumers). The purchaser would preferably identify which of these categories it is in, as well as its address and contact information. Different educational information, or warnings, or messages, could be provided to the consumer from the website, depending on which category of purchaser accesses the website. For example, consumer end-users could be provided additional information about the specific benefits of probiotics for health, as well as any reported adverse reactions or events reported by other consumers for the formulation or for other probiotic formulations (which consumers would also be queried about and asked to enter). Product seller-purchasers could be warned to not violate any product agreements or restrictions, including, for example, any restriction on re-selling the products, including those relating to patent or copyright licenses granted to the purchaser.

As well as providing identifying and contact information in order to access product information, purchasers would preferably also enter an agreement with the supplier or producer (on the website) to use the quality information provided about the product only for the purpose of evaluating the suitability of the product for consumption, and to keep all the product information confidential. Other restrictions on purchasers could optionally also be included, including advertising restrictions, resale pricing and acceptable buyers for the product from the purchaser (which might be only consumers or could include downstream sellers, like retailers), and acceptable channels of distribution (like, direct person to person sales only; internet sales only; mail order sales only).

In addition to quality testing of the product, other information about the product could also be monitored and provided, directly on the website or by messaging. Such added information could include the product storage and shipment conditions, such as temperature, humidity, and time of exposure. Probiotics can degrade if exposed to temperatures above refrigeration, or if exposed to temperatures below freezing. Higher humidity generally results in a higher effective temperature of exposure than the actual ambient temperature (the so-called "heat index" effect). Temperature and humidity logging devices can be included with the product or the product lot, and follow it through shipment, for temperature and humidity monitoring. Such logging devices are discussed in U.S. Pat. Nos. 7,392,150 and 5,798,694, incorporated by reference herein.

Quality, Quantity and Purity Testing

The website accessible by the purchaser provides results of quality assurance testing for the products' number of colony forming units ("CFU"), activity, purity, and possibly other information including its testing date, production date and lot number. The lot number is important as the quality assurance testing is done by randomly sampling products from each lot. The number of products so sampled and tested preferably should be noted as part of the testing, along with a statistical analysis of the results, including preferably a standard deviation. The standard deviation should be such that product parameters tested (including CFU, activity, purity) are within one standard deviation of the claims about the product (including CFUs of probiotic bacteria, activity and purity) made on the product label.

The quantity of probiotic bacteria per dose is tested by determining the number of colony forming units. The CFU is usually determined by growing bacterial cells into a visible colony on a Petri dish containing appropriate agar for bacterial growth. One visible colony is one CFU, even though a single CFU may contain many bacterial cells or only one cell.

In determining the CFUs, one often overlooked factor that dramatically affects the actual quantity of probiotic which enters the small intestine, where it can be absorbed and effective, is the fact that the probiotic experiences significant degradation in the highly acidic environment of the stomach. An accurate in vitro determination of CFUs would, therefore, be undertaken following a simulated exposure of the product formulation to stomach acid. The acidity of the stomach is about pH 1.6, so exposure to such levels for a period approximating the time of passage through the stomach should be simulated. The time of stomach passage can be up to 90 minutes, especially if the probiotic formulation is taken with or near the time of food ingestion.

To prevent clumping of the bacteria with other ingredients in the formulation, particularly clumping with enteric coatings such as alginates or gums or other similar ingredients, it has been found that the acid around the probiotic formulation should be circulated, in the manner in which the acid in the stomach circulates. A simulation of stomach acid circulation can be done using a stomacher machine, such as the Stomacher® 400 Circulator (Seward, Co., UK). Under such conditions, the effective dosage of the probiotic—through determining CFUs obtained following exposure to a solution of about pH 1.6 in a stomacher—can be reliably determined. The CFUs under such conditions would preferably be posted on the website for access by the purchaser. CFU counts and other quality analysis can be done internally, or by an outside laboratory.

Other quality checks on the product preferably include activity, growth rate and purity. Growth rate and activity can be determined as described in U.S. Pat. No. 8,568,712, incorporated by reference. The principle of growth rate determination is that a uniform sample from a flask where bacteria can feed on growth medium substrate is transferred into a Turbidimeter cell, and greater turbidity indicates greater growth. The lactic acid production of a sample is also measured, and higher production of lactic acid indicates higher bacterial activity.

It should be noted that CFU, growth and activity testing refers to the bacterial probiotic components of the formulations. U.S. Pat. No. 8,568,712 discusses selling prebiotics as separate formulations, without probiotics included. In such case, the effect of these prebiotics on probiotic growth is the relevant quality information; i.e., one would how many CFUs of particular probiotic strains they induce, and whether there is enhanced activity of such strains.

Purity testing is for common contaminants and pathogens, including but not limited to *Escherichia coli*, Staphylococci, *Salmonella* and yeast and mold. There are standard tests to determine quantity and presence of these contaminants, as set forth in the United States Pharmacopeia and the Bacteriological Analytical Manual (both incorporated by reference).

Quality Information about Components in the Final Formulation

In the case where the final probiotic formulation consists of multiple components, which are made by different manufacturers, the verification system described herein can be expanded so that the quality analysis and information for all components is available to the purchaser. These added components might include one or more strains of the *lactobacillus* or *bifidobacterium* in the formulation, enteric coating components (such as alginate or xanthan gum), polysorbate 80, polysorbate 60 (see U.S. Pat. No. 8,066,986, incorporated by reference) oleic acid, lecithin (see U.S. Pat. No. 8,105,577, incorporated by reference), enzymes (including $\alpha$-galactosidase and $\beta$-glucanase), prebiotics (including iso-malto oligosaccharides, see U.S. Pat. No. 8,568,712, incorporated by reference) partially hydrolyzed guar gum, inulin and dextrin, and other carriers, binders or adsorbents, including but not limited to food grade starches and silicates. The above formulations can be packaged for administration in capsules, tablets or packets, or combinations thereof. Alternatively, they can be added to foods (including yogurt and dairy products, desserts, cereals, and breads), separately or in combination, to enhance growth and activity of indigenous probiotic bacteria.

Where the final probiotic formulation consists of multiple components, the manufacturer of each component would preferably post its quality analysis on the website accessible by the purchaser. As an example, the manufacturer(s) of probiotic bacteria in the product would analyze (by lot) and post the results of that analysis. The manufacturer of any enzymes or prebiotics would also analyze by lot and post those results. The manufacturers could also be obligated by agreement to include all such information and to cooperate in posting of results to the website. The final formulation results would include the lot number of all components in it, so all analyses can be viewed by the purchaser. See FIG. 2.

All testing of all components should preferably include a statistical analysis of the results, including at least a standard deviation. The standard deviation should preferably be such that product parameters tested are within one standard deviation of the claims about the product made on the product label.

Adverse Events, Positive Results and Marketing Information

The end user-consumer would, when accessing the website with product information, preferably also be queried about product complaints, adverse reaction and positive responses, and consumer interest in and reaction to different formulations and products, as well as demographic, general health and education information, and other purchaser and information (including any information useful for marketing and future product development and selection).

In the event of complaints, side effects or adverse reactions, or positive responses, the consumer would be asked to provide information about race, ethnicity, other natural supplements and drugs consumed, diet, alcohol consumption, and blood type or HLA typing results (if known). In a further analysis, the consumer could provide body fluid samples or swabs for genetic analysis. The foregoing factors could affect the consumer's reaction to the product, and isolation of which factors are involved in such reactions could be determined by compilation and analysis of such consumer information. The identification of factors involved in positive and adverse reactions could also be used by the producer for product design. For example, if a population is identified which cannot tolerate a particular bacterial strain or prebiotic component, a product without such strains or components could be designed for sale to that population. Similarly, if particular foods or substances are identified with adverse reactions, warning labels could be placed on the product label to not consume them with the product.

All such consumer information can be compiled and analyzed statistically, in determining efficacy or adverse events about the product. For example, there could be a threshold for the number of side effects which need to be reported before a side effect is deemed significant enough to warrant adding a warning label for any particular population.

Consumers could also be encouraged to report complaints, side effects or adverse reactions, or positive responses, by contract with the party controlling the website, for example, entered at the time of initially activating an account on the website. Or, consumers could be provided a reward system (such as a discount on buying future products) for making a report. The rewards could be in electronic or printed form.

A reward system could also be used to encourage consumers and other purchasers to provide their identifying information, and other information along with the product code. The website would monitor and control the rewarding system, and awarding of rewards to consumers. In this way, the producer, through the website, promotes authenticating of all its products in commerce, and helps reduce counterfeiting.

A reward system can be tailored to as to encourage consumers to purchase excess inventory (by increasing the total number of rewards distributed or increasing their value in reimbursement for product purchase). Such reward system can also reduce sales in the event supplies of product run low. The precise adjustment to the rewards in any of these cases could be performed by heuristic methods or the methods associated with pricing science, as a demand optimization problem, where the production of product is limited.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, any of the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims. It is also noted that as used herein and in the appended claims, the singular forms "a," "an," and "the" include plural reference, and the plural include singular forms, unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The invention has been described broadly and generically herein. Each of the narrower species and subgeneric groupings falling within the generic disclosure also form part of the invention. The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method of verifying the authenticity and quality of a formulation including probiotic bacteria and other components purchased from a producer, comprising:
   encoding the formulation with a code that can be scanned and transmitted to a website controlled by the producer;
   receiving the scanned code at the website for authentication of the code; and
   providing information from the website, following authentication, about quality testing on the formulation, including the formulation's bacterial CFU counts, activity and purity; or, if authentication fails, alerting the producer to said authentication failure.

2. The method of claim 1 wherein the code is a two-dimensional bar code imprinted on a label on the formulation packaging.

3. The method of claim 1 further including providing a purchaser of the formulation information from the server, following authentication, including the lot number of the formulation and its date of production.

4. The method of claim 3 further including providing the purchaser information from the server, following authentication, about quality testing of the other components in the formulation.

5. The method of claim 4 wherein the information about the quality testing of the other components in the formulation is provided by the manufacturers of the components.

6. The method of claim 3 further including the server requesting information from the purchaser.

7. The method of claim 6 wherein the information about the purchaser includes its address and contact information.

8. The method of claim 6 wherein the information includes the source of the formulation, and contact information for the source.

9. The method of claim 3 further including the server requesting the purchaser to scan the code.

10. The method of claim 6 further including the server requesting from the purchaser whether it intends to sell the formulation to a third party or consume the formulation itself.

11. The method of claim 3 further including providing the purchaser information about benefits of probiotics for health, and any reported adverse events or reactions from probiotics or from the formulation.

12. The method of claim 11 wherein the information is provided after the purchaser is authenticated by the website.

13. A method of verifying the authenticity and quality of a formulation including probiotic bacteria and other components purchased from a producer, comprising:
   encoding the formulation using a scannable code or an RFID tag wherein encoded information can be scanned and transmitted to a server controlled by the producer or a third party; and
   authenticating the code or the RFID tag by the server;
   providing information from the website about quality testing on the formulation, including the formulation's bacterial CFU counts, activity and purity; unless authentication fails, in which case, the producer or third party is alerted to said authentication failure.

14. The method of claim 13 wherein a purchaser scans the information and is granted the lot number of the formulation and its date of production, upon authentication.

15. The method of claim 14 further including providing the purchaser information from the server, following authentication, about quality testing of the components in the formulation.

16. The method of claim 15 wherein the information about the quality testing of the components in the formulation is provided by the manufacturers of the components.

17. The method of claim 15 further including the server requesting information from the purchaser.

18. The method of claim 15 further including the server requesting the purchaser to scan the code.

19. The method of claim 15 wherein in the event that authentication fails, the purchaser is queried to identify the source of the formulation, and contact information for the source.

20. The method of claim 15 wherein a two-dimensional bar code is imprinted on a label on the formulation packaging.

21. A server for verifying the authenticity and quality of a formulation including probiotic bacteria and other components purchased from a producer, comprising:
   means for encoding the formulation with a code that can be scanned and transmitted to the server;
   means for receiving the scanned code at the server for authentication of the code; and
   means for providing the purchaser information from the server, following authentication, about quality testing on the formulation, including the formulation's bacterial CFU counts, activity and purity; or, if authentication fails, alerting both purchaser and producer to said authentication failure.

* * * * *